United States Patent [19]

Taft

[11] Patent Number: 4,922,121

[45] Date of Patent: May 1, 1990

[54] MODULATOR ASSEMBLY

[75] Inventor: Philip A. Taft, Solihull, Great Britain

[73] Assignee: Lucas Industries Public Limited Company, Birmingham, England

[21] Appl. No.: 272,440

[22] Filed: Nov. 17, 1988

[30] Foreign Application Priority Data

Nov. 20, 1987 [GB] United Kingdom ............... 8727292

[51] Int. Cl.⁵ ........................... B60T 8/42; B61L 7/00
[52] U.S. Cl. .................................. 303/115; 303/113; 188/162; 251/127.09
[58] Field of Search ................. 303/3, 20, 61, 68, 100, 303/110, 113, 114, 115; 180/197; 60/547.1; 188/158, 161, 162, 181 A; 310/49 R, 77; 251/129.09

[56] References Cited

U.S. PATENT DOCUMENTS

| | | | |
|---|---|---|---|
| 3,420,580 | 1/1969 | Dymond | 183/181 A |
| 3,549,210 | 12/1970 | Birge et al. | 303/61 |
| 3,626,220 | 12/1971 | Niculescu | 310/77 |
| 3,690,736 | 9/1972 | Smirl et al. | 303/61 |
| 3,836,207 | 9/1974 | Belart | 303/115 |

FOREIGN PATENT DOCUMENTS

| | | | |
|---|---|---|---|
| 0571367 | 2/1933 | Fed. Rep. of Germany | 310/77 |
| 0806976 | 4/1951 | Fed. Rep. of Germany | 310/77 |
| 1156608 | 10/1963 | Fed. Rep. of Germany | 310/77 |
| 1916662 | 10/1970 | Fed. Rep. of Germany | 303/113 |
| 0088651 | 4/1987 | Japan | 188/181 A |
| 0872344 | 10/1981 | U.S.S.R. | 303/115 |
| 1286452 | 1/1987 | U.S.S.R. | 303/115 |
| 2188111 | 9/1987 | United Kingdom | 303/115 |

Primary Examiner—Andres Kashnikow
Assistant Examiner—Timothy Newholm
Attorney, Agent, or Firm—Fleit, Jacobson, Cohn, Price, Holman & Stern

[57] ABSTRACT

A modulator assembly for a vehicle braking system includes a valve means for isolating a master cylinder from a brake actuator when a wheel slip condition arises at a braked wheel. Pressure modifying means is provided in the form of a piston which is moved axially by rotation of a motor armature 11 via a screw threaded connection to modify the braking pressure to correct the slip condition. Axial movement of the armature 11 moves a valve stem axially to close the valve means.

20 Claims, 3 Drawing Sheets

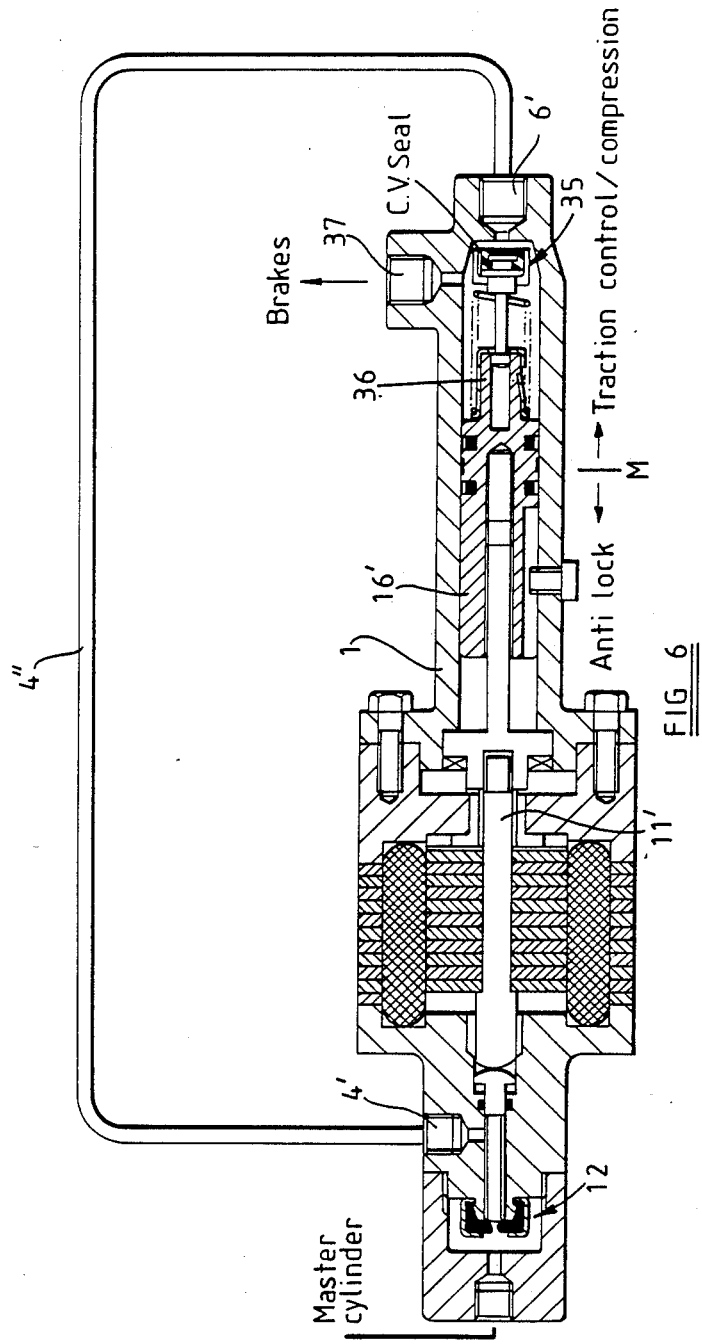

4,922,121

MODULATOR ASSEMBLY

BACKGROUND OF THE INVENTION

This invention relates to a modulator assembly for use in a hydraulic vehicle braking system and is of the general type which includes valve means operable, in use, to isolate a pressure source from a brake actuator upon the occurrence of an incipient wheel skid and/or spin condition at a wheel braked by the actuator, and pressure modifying means operable to vary the pressure in the actuator in such a manner as to effect a correction of the wheel slip condition.

In one form of system of this general type for use in an anti-skid braking system, the pressure-modifying means is a de-booster device which is conveniently moved axially to vary said volume, being driven from a rotary armature of an electric motor by way of a screw mechanism. Actuation of the valve means, however, requires a sudden and rapid actuating impulse in one direction in order to produce a substantially instantaneous interruption of master cylinder pressure when a skid condition arises. Because of the incompatibility of these requirements, their implementation cannot readily be achieved without recourse to excessively complex and expensive mechanism.

BRIEF SUMMARY OF THE INVENTION

An object of the invention is to provide a modulator assembly of the aforesaid general type in which the necessary operative wheel slip corrective functions are achieved by relatively simple and convenient means.

According to the present invention, in a modulator assembly of the aforesaid general type, the valve means and pressure modifying means are actuated simultaneously by a single electrical drive device, an armature of which moves axially to actuate the valve means and rotationally to actuate the pressure modifying means.

In one convenient arrangement, the electrical drive device is a stepper motor, preferably of the switched reluctance type, of which the rotary and fixed poles conveniently present respective opposed axially facing surfaces which co-act to cause axial movement of the rotary armature when the device is energized. The pressure modifying means is conveniently connected to the armature by a coupling permitting relative axial movement between the two and forming a threaded connection with the pressure modifying means such that rotation of the armature produces axial movement of the pressure modifying means.

The pressure modifying means is preferably a piston axially movable in relation to a pressure modifying chamber connected, in use, to a brake actuator, whereby movement of the piston to vary the volume of the chamber causes a corresponding variation of the braking pressure.

BRIEF DESCRIPTION OF THE DRAWINGS

The invention will now be described, by way of example, with reference to the accompanying diagrammatic drawings wherein:

FIGS. 4 to 6 are cross-sectional views respectively of alternative forms of the modulator assembly of the invention.

DETAILED DESCRIPTION

Figure 1:
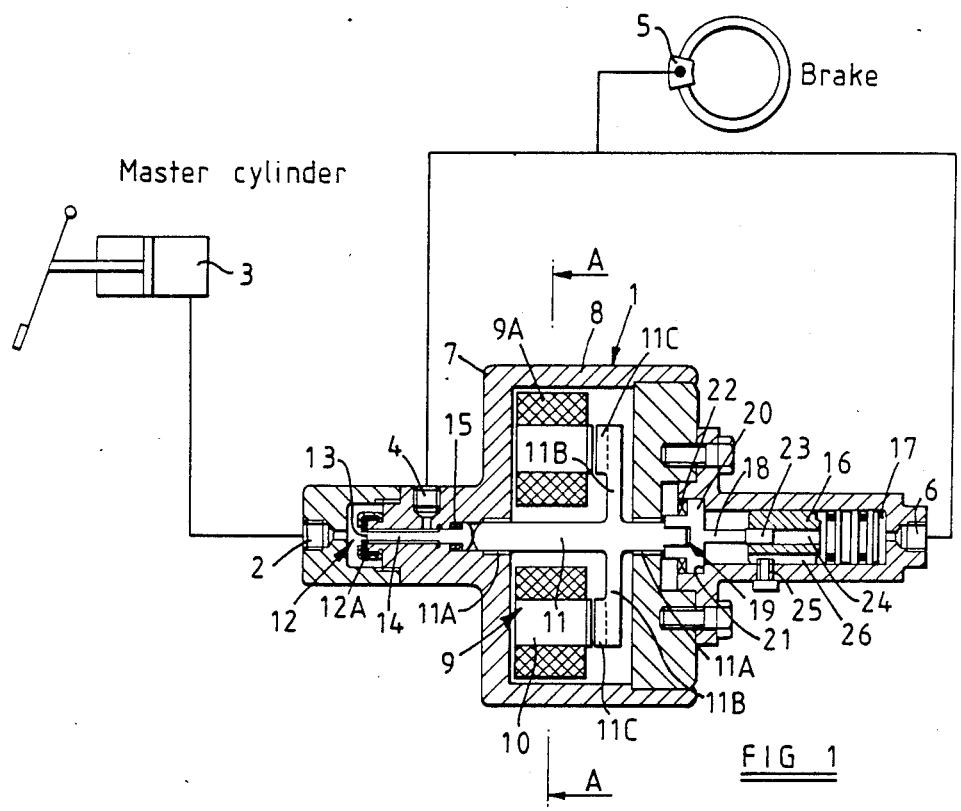
FIG. 1 is a longitudinal cross-sectional and partly schematic view, of part of one form of braking system incorporating the modulator assembly of the invention.
Figure 2:
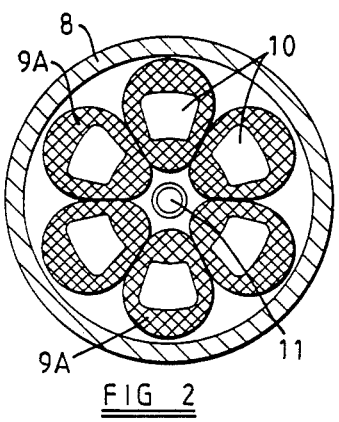
FIG. 2 is a cross-sectional view taken on the line A—A of FIG. 1.

Referring to FIG. 1, the hydraulic braking system illustrated therein includes a modulator assembly of the invention, indicated generally at 1, of which a fluid inlet 2 is connected to a pedal-operated master cylinder 3. A fluid outlet 4 is connected to a brake actuator 5, which is also connected to a further port 6 of the modulator assembly.

A generally cylindrical casing 7 of the modulator assembly has a relatively large central portion 8 which houses an electric stepper motor 9, preferably of the switched reluctance type, and of which the fixed windings 9A and stationary pole pieces 10 are rigidly secured to the housing. A rotary armature shaft 11 extends through the fixed windings and is rotationally supported in the housing by bearings 11A. The left-hand portion of the casing, as seen in the drawing, houses a cut-off valve 12 which includes a cup-shaped resilient seal element 12A having an orifice 13 therein, and an axially extending valve element in the form of a stem 14 slidable in a bore of the housing and urged by a spring 15 into engagement with an adjacent end of the armature shaft 11. The armature shaft 11 is capable of limited axial driven movement, for the purpose to be described hereinafter.

A right-hand end portion of the casing, as seen in the drawing, houses a pressure modifying means in the form of a de-booster device shown as a piston 16 slidably mounted in a bore of the casing, an extreme end portion of which forms a de-boost chamber 17 which communicates with the actuator 5 via the port 6. A coupling member 18 forms a tongue and groove coupling connection 19 with the armature shaft 11, enabling rotary drive to be imparted from the shaft to the coupling member, whilst simultaneously permitting axial movement of the shaft. An enlarged portion 20 of the coupling member is held between a shoulder 21 of the casing and a thrust bearing 22, so that axial movement of the coupling member is prevented. An extreme free end portion 23 of the coupling member has an external thread, which is preferably non-reversible, and engages a correspondingly internally threaded bore 24 of the piston 16, so that rotation of the coupling member in one direction or the other produces corresponding axial movement of the piston. Rotation of the piston is prevented by a key element 25 secured to the casing and extending into an axial groove 26 of the piston.

The shaft 11 is provided with a plurality of radial extensions 11B conveniently corresponding in number to the number of stationary pole pieces 10, i.e. six in the case illustrated. Each extension 11B carries a pole piece 11C having an axially facing surface opposed to, but normally spaced from, a corresponding surface of one of the stationary pole pieces 10. Energization of the coils 9, produces rotation of the shaft 11 and also axial movement thereof in a leftward direction, as seen in the drawings.

For normal braking operations in which no skid condition is sensed, the valve stem 14 is held by the spring 15 in its extreme rightward position, as governed by its abutment with the motor shaft 11, in which position the end of the stem lies to the right of the orifice 13 of the seal element 12A, permitting unrestricted communication between the master cylinder and brake actuator 5.

The stem 14 has a clearance within its bore and/or grooves or similar formations, providing a fluid path between the fluid inlet 2 and fluid outlet 4 via the seal element. Upon sensing of an incipient skid condition, an electronic control device (not shown) causes a signal to energize the coils 9 thereby attracting the poles 11C and so moving the shaft 11 to the left. This axial movement of the shaft 11 urges the stem 14 against the action of the spring 15 to a position in which the free end of the stem blocks the orifice 13 of the seal element 12A to cut off the master cylinder from the actuator. The shaft is simultaneously caused to perform a very rapid incremental rotation, by interaction between the movable poles 11C and fixed poles 10. This causes the de-boost piston 16 to be moved axially along the threaded portion 23 of the coupling device 18 in a direction such as to increase the volume of the de-boost chamber 17 and thereby reduce the pressure in the brake actuator connected to the outlet 6. The tongue and groove connection 19 between the shaft 11 and coupling device 18 permits the necessary simultaneous rotation and axial movement of the shaft relative to the piston 16. When the skid condition ceases, the shaft 11 is rotated in the opposite direction, moving the piston 16 axially towards its original position and thereby increasing the pressure in the de-boost chamber 17 for brake re-application. Simultaneously, the orifice 13 of the seal element 12A is re-opened to re-connect the master cylinder to the brake. During this brake re-application phase, the valve stem 14 is advantageously caused to operate in such a manner that only a restricted fluid flow is permitted initially past the stem in order to prevent the occurrence of an excessive pressure rise rate in the brake actuator.

Figure 3:
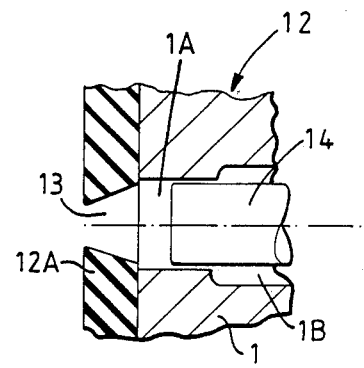
FIG. 3 is an enlarged detail of part of FIG. 1.

This is achieved using the arrangement shown in FIG. 3, from which it can be seen that the part of the body 1 immediately adjacent the seal element 12A is internally stepped to form a first bore portion 1A through which the stem 14 extends with a small clearance and a second larger diameter bore portion 1B leaving a relatively large clearance around the stem. It will be seen that, as the stem 14 is withdrawn from the seal element 12A, its free end portion lies first within the bore portion 1A, permitting only a restricted fluid flow along the stem through the small clearance within this bore portion and thereby limiting the rise rate in the pressure re-applied to the actuator 5. When the stem moves from the bore portion 1A to the portion 1B, fluid flow is substantially unrestricted, permitting the master cylinder pressure to match that produced by the de-boost piston.

In the event of an electrical failure occurring with the cut-off valve in its closed condition, the spring 15 is able rapidly to move the valve stem 14 to the right, thereby opening the orifice 13 and re-establishing communication between the pressure fluid inlet 2 and outlet 4. The action of the spring is supplemented by the master cylinder pressure acting on the free end of the stem 14.

Figure 4:
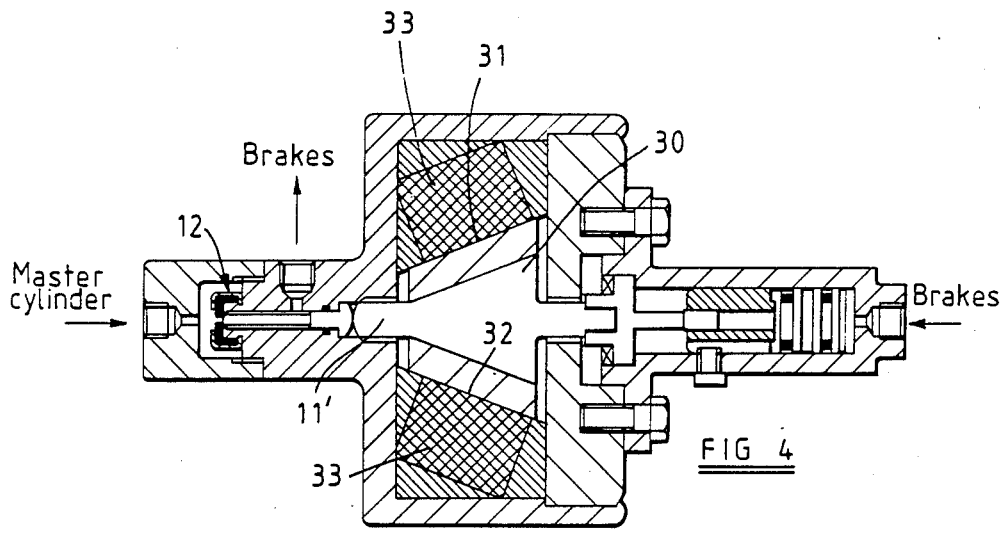

The alternative embodiment illustrated in FIG. 4 is similar in its general arrangement and operation to that of the previous embodiment. The main difference is that the armature shaft 11' is provided with a large central body 30 of generally truncated conical form, providing inclined pole pieces 31 for co-operation with correspondingly inclined surfaces 32 of the coils 33. This arrangement enables both axial and rotational loading to be sustained by the shaft pole pieces 31. Other alternative arrangements of pole pieces can also be contemplated.

Figure 5:
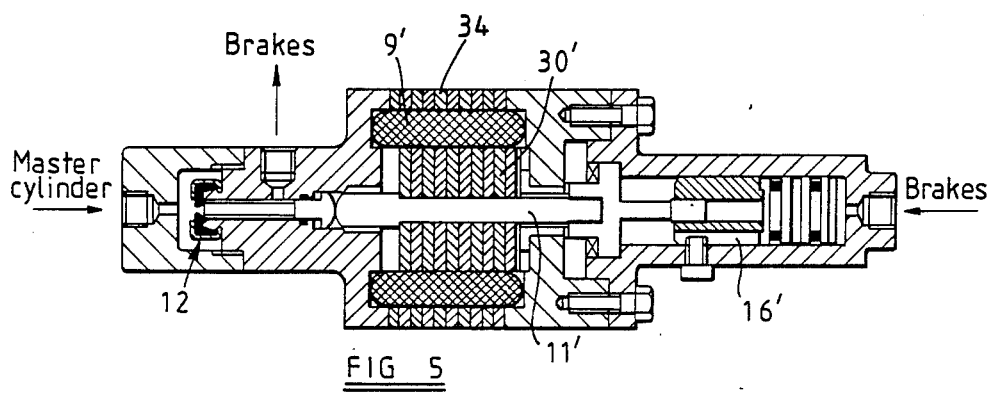

FIG. 5 illustrates a further alternative embodiment which is again similar to FIG. 3 except for the nature of the electric motor components. In this embodiment, the rotary armature 30' is concentrically mounted on the shaft 11' within the windings 9', but in the de-energized condition illustrated, the rotor poles are axially out of alignment with the surrounding stator poles 34. When the motor is energized at the onset of an incipient skid condition, the rotor is moved axially as its poles move into alignment with the stator poles and this closes the cut-off valve 12' as described previously. Simultaneously, or slightly thereafter, the rotor turns to move the de-boost piston 16' axially to de-boost the brake actuator, as described previously.

The alternative embodiment illustrated in FIG. 6 is capable of correcting both wheel skid and wheel spin conditions. The motor components and cut-off valve 12' are the same as those illustrated in any of the preceding FIGS. 1 to 5, as is the coupling of the shaft 11' to the de-boost piston 16'. The principal difference is that an outlet 4', previously connected directly to a brake actuator, is now connected by a flow line 4" to an inlet port 6' at the opposite end of the housing 1. Fluid flow through this port is controlled, in this example, by a conventional center valve assembly 35 carried by a nose 36 formed on the forward end of the piston 16'. When the valve is in its illustrated open position the port 6' communicates with a pressure fluid outlet 37 connected, in use, to a brake actuator.

For normal braking and the correction of an incipient skid condition, the illustrated device operates in the same manner as the FIG. 5 embodiment the piston 16' moving to the left, as seen in the drawing, from an illustrated intermediate rest position M to de-boost the brake actuator. When excessive wheel spin is sensed, requiring the application of traction control, the controller (not shown) causes the motor to drive the piston 16' from the intermediate position M to the right. The first effect of this is that the valve 35 is caused to close off the port 6', enabling the brakes then to be pressurized by further rightwards movement of the piston. Pressure modulation may be effected, in order to maximize the traction or anti-skid control by changing the rotational direction of the motor under the influence of the controller.

In the embodiments described above, the action of the rod to produce a two-stage re-pressurizing effect during anti-skid operation is controlled by using the motor poles 10. The motor will, at this stage, be stationary, having completed its driving of the piston 16 to re-boost the actuator. The motor may now be placed in a condition in which only one, or a selected small number of the poles 10, are energized and by gradually decreasing the energizing current at a desired rate, the rate of rod retraction through the bore portions 1A, 1B may be very closely controlled, to enable the aforesaid two stage re-pressurization to be performed in a desired manner.

The threaded connection between the coupling member and piston may be either reversible or non-reversible, according to the particular requirements of the device, in use. When a non-reversible thread is employed, the motor may be held in a given position under applied pressure by using a thread form in which the thread helix angle is substantially equal to the friction angle, thereby ensuring that the inherent thread frictional torque is sufficient to prevent relative rotation between the threads when the piston is subject to fluid pressure force. This avoids the necessity to provide retaining torque for the armature by, for example, using detent means or a motor holding current. By varying the helix angle about the friction angle, certain beneficial performance characteristics can be achieved. For example, reduced power consumption may be obtained for some modes of operation and power equalization may be achieved for both de-boost and re-apply modes, even though the armature rotational speeds are significantly different in these modes.

By suitable programming of the controller, the modulator assembly of FIG. 6 may be operated to provide a "hill hold" facility. This would normally operate with a vehicle stationary on an incline and with the vehicle in gear and clutch disengaged. An appropriate signal sent from the controller to the motor under these conditions causes the piston 16' to be advanced (closing the valve 35) to pressurize one or more brake actuators so as to prevent the vehicle from running backwards down the hill. The brake(s) would be released as the clutch is engaged.

It will be seen that the invention provides a particularly simple and convenient arrangement by enabling the cut-off valve and pressure-modifying piston to be actuated by a single electrical drive means under the influence of an electronic controller, enabling "intelligent" braking to be achieved which is responsive to a wide range of operating conditions.

I claim:

1. A modulator assembly for use in a hydraulic vehicle braking system comprising:
    valve means operable, in use, to isolate a pressure source from a brake actuator upon the occurrence of an incipient wheel slip condition at a wheel braked by the actuator;
    pressure modifying means operable to vary the pressure in the actuator in such a manner as to effect a correction of said wheel slip condition; and
    a single electrical drive device having a rotatable and axially movable armature which moves axially for actuating said valve means and rotationally for simultaneously actuating said pressure modifying means.

2. A modulator assembly as claimed in claim 1, wherein said single electrical drive device comprises a stepper motor.

3. A modulator assembly as claimed in claim 2, wherein said single electrical drive device comprises a switched reluctance motor.

4. A modulator assembly as claimed in claim 1, wherein co-acting rotary and fixed poles are provided on said electrical drive device to cause rotary and axial movement of said rotary armature when said electrical drive device is energized.

5. A modulator assembly as claimed in claim 1 and further comprising:
    a coupling connecting said pressure modifying means to said armature for permitting relative axial movement therebetween; and
    a threaded connection between said coupling and said pressure modifying means so that rotation of said armature produces axial movement of said pressure modifying means.

6. A modulator assembly as claimed in claim 1 wherein said pressure modifying means comprises a pressure chamber connected to said brake actuator, and a piston axially movable in said pressure chamber so that movement of said piston varies the volume of said pressure chamber to cause a corresponding variation of the braking pressure.

7. A modulator assembly as claimed in claim 1 wherein said valve means comprises two stages, a first of said stages providing restricted fluid flow through said valve, and a second of said stages providing substantially unrestricted flow through said valve means.

8. A modulator assembly as claimed in claim 7 wherein said valve means comprises:
    a bore having a relatively small diameter portion and a relatively large diameter portion, and a seal element adjacent said small diameter portion remote from said large diameter portion for closing said valve means, a movable valve element reciprocable in said bore toward and away from said seal element and engageable therewith for closing said valve means, so that said restricted and substantially unrestricted stages occur when said valve element is within said small diameter bore portion and said large diameter bore portion, respectively.

9. A modulator assembly as claimed in claim 8 wherein means are provided for urging said valve means towards a position permitting said unrestricted flow.

10. A modulator assembly as claimed in claim 1 wherein:
    said electrical drive device comprises a plurality of adjacent coils and inclined surfaces on said coils; and said armature comprises a body of substantially truncated conical form having correspondingly inclined pole pieces thereon for co-operation with said inclined surfaces of said adjacent coils.

11. A modulator assembly as claimed in claim 1 wherein said electrical drive device comprises stator poles surrounding said rotary armature, and said rotary armature is axially offset from said surrounding stator poles when sid drive device is de-energized, said armature moving axially into alignment with said stator poles to close said valve means when said electrical drive device is energized upon the occurrence of an incipient wheel slip condition.

12. A modulator assembly as claimed in claim 1 and further comprising:
    a casing;
    a first fluid outlet in said casing connected to and controlled by said valve means;
    a fluid inlet in said casing connected to said first fluid outlet;
    a second fluid outlet connected to the brake actuator;
    further valve means connected between said fluid inlet and second fluid outlet; and
    means for actuating said further valve means by movement of said pressure modifying means, so that movement of said pressure modifying means in one direction with said valve means closed reduces the braking pressure to correct a wheel skid condition and movement of said pressure modifying means in the opposite direction induces closing of said further valve means and an increase in braking pressure to correct a wheel spin condition.

13. A vehicle braking system incorporating a modulator assembly as claimed in claim 1 and further comprising:
    a master cylinder having an outlet connected to said valve means for providing the pressure source;
    at least one wheel; and a brake actuator for actuating a brake on said at least one wheel and operatively connected to said valve means for operation thereby.

14. A modulator assembly for use in a hydraulic vehicle braking system comprising:
   valve means operable in use to isolate a pressure source from a brake actuator upon the occurrence of an incipient wheel slip condition at a wheel braked by the actuator;
   pressure modifying means operable to vary the pressure in the actuator to correct the wheel slip condition;
   a single electrical drive device having a rotatable and axially movable armature disposed between said valve means and said pressure modifying means, said armature having opposite ends thereon, one of said ends being engageable with said valve means; and
   coupling means connecting the other end of said armature to said pressure modifying means for providing a rotary driving connection between said armature and said pressure modifying means and providing relative axial movement between said armature and said pressure modifying means to enable said armature to actuate said valve means, so that said valve means and pressure modifying means are simultaneously actuated by said electrical drive device.

15. A modulator assembly as claimed in claim 14 wherein:
   a tongue and groove connection is provided between said other end of said armature and said coupling means;
   means is provided for substantially preventing axial movement of said coupling means; and
   said armature is axially movable relative to said coupling means.

16. A modulator assembly as claimed in claim 15 wherein said coupling means further comprises:
   a coupling member; and
   a screw threaded connection between said coupling member and said pressure modifying means so that rotation of said armature axially moves said pressure modifying means.

17. A modulator assembly as claimed in claim 16, wherein coacting rotary and fixed poles are provided on said electrical drive device to cause rotary and axial movement of said rotary armature when said electrical drive device is energized.

18. A modulator assembly as claimed in claim 17 wherein said pressure modifying means comprises a pressure chamber connected to said brake actuator, and a piston axially in movable in said pressure chamber so that movement of said piston varies the volume of said pressure chamber to cause a corresponding variation of the braking pressure.

19. A modulator assembly as claimed in claim 14 wherein said coupling means further comprises:
   a coupling member; and
   a screw threaded connection between said coupling member and said pressure modifying means so that rotation of said armature axially moves said pressure modifying means.

20. A modulator assembly as claimed in claim 14, wherein coacting rotary and fixed poles are provided on said electrical drive device to cause rotary and axial movement of said rotary armature when said electrical drive device is energized.

* * * * *